Nov. 15, 1966   C. CLARK   3,284,911
LAY-OUT TOOL

Filed Sept. 28, 1964   3 Sheets-Sheet 1

INVENTOR.
CURTIS CLARK

BY
Caesar, Rivise, Bernstein & Cohen

ATTORNEYS.

Nov. 15, 1966   C. CLARK   3,284,911
LAY-OUT TOOL
Filed Sept. 28, 1964   3 Sheets-Sheet 2
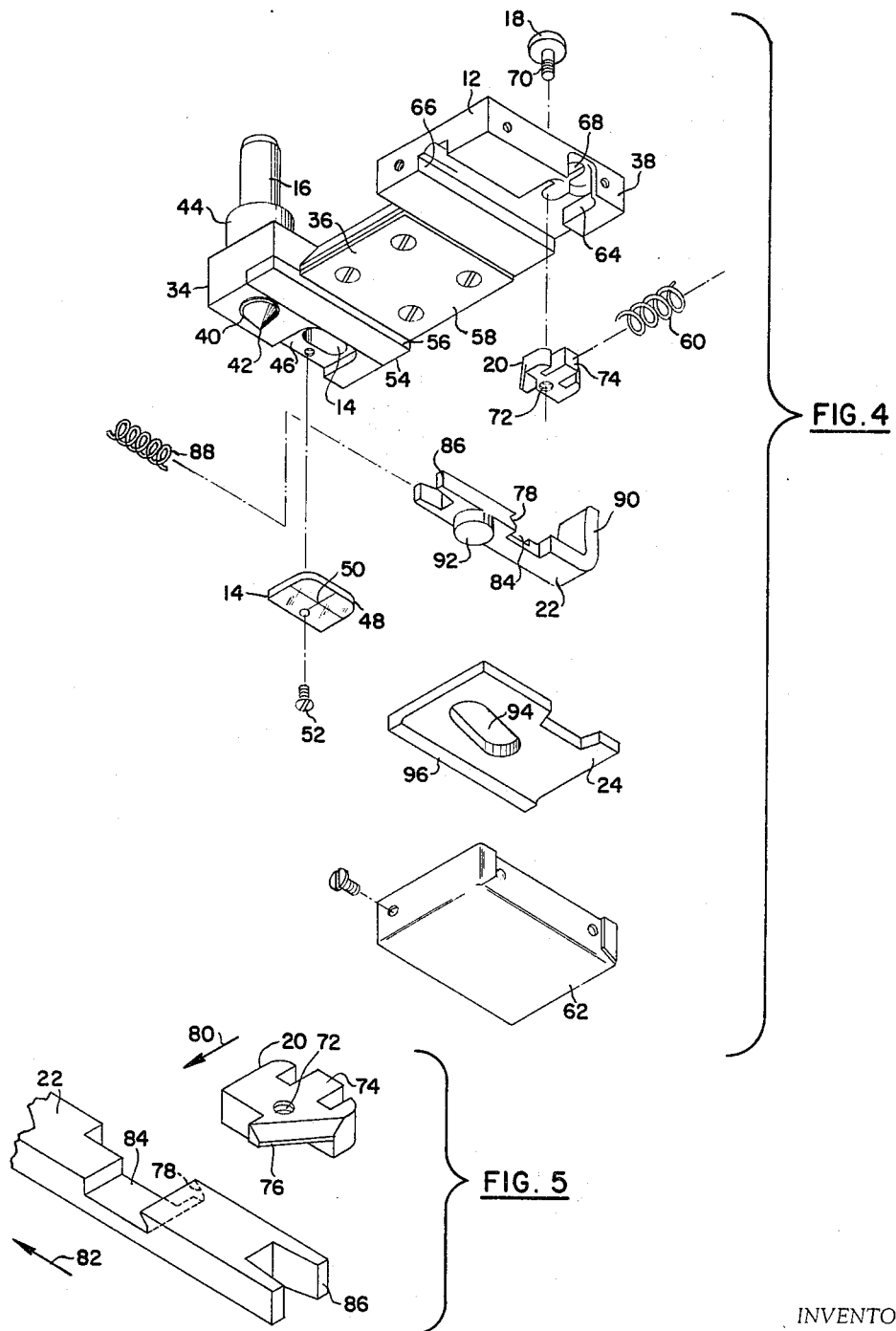
INVENTOR.
CURTIS CLARK
BY
Caesar, Rivise, Bernstein & Cohen
ATTORNEYS.

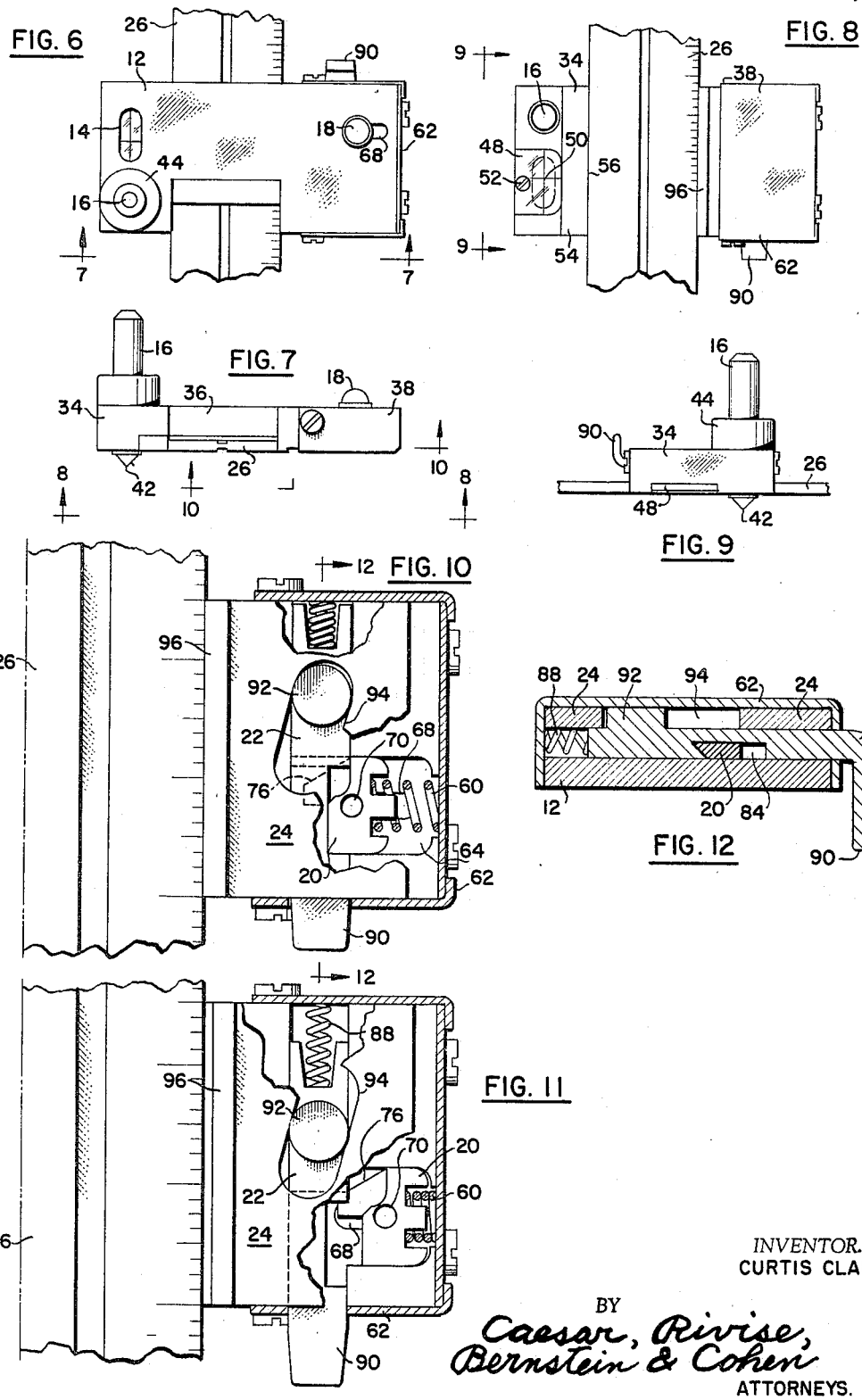

ical relationships with respect to the

United States Patent Office 3,284,911
Patented Nov. 15, 1966

3,284,911
LAY-OUT TOOL
Curtis Clark, 120 S. Redfield St., Philadelphia, Pa.
Filed Sept. 28, 1964, Ser. No. 399,764
8 Claims. (Cl. 33—189)

This invention relates to a lay-out tool and has as its objective the provision of a lay-out tool which is relatively simple in construction but reliable in use, and particularly desirable because of the accuracy in the laying out of hole centers on sheet metal which can be obtained thereby.

The accurate laying out of hole centers has always presented problems to a mechanic following a design shown in a print. Where the holes are to be located with reference to a particular line, a variety of devices have been proposed in order to locate accurately hole centers with reference to such a line. These devices, however, have proved to be relatively expensive since they included many parts which, of necessity, created a relatively complex device. For this reason, the maintenance of such devices and the repair thereof required precision work.

It is therefore an object of the present invention to provide a lay-out tool which achieves the laying-out of a plurality of hole centers on sheet metal in a simple but accurate manner.

Yet another object of the present invention is to provide a lay-out tool which is usable with a conventional bevel protractor.

Still another object of the present invention is to provide a lay-out tool which is relatively simple in construction but which is economical in both manufacture and repair thereof.

The foregoing as well as other objects of invention are achieved by providing a lay-out tool which may be secured at a desired point on the scale of a bevel protractor by the provision of a novel locking mechanism. The present invention further contemplates a body member which accommodates the locking mechanism and also a locating window which may be used in conjunction with a center punch. The body member includes a central area defined in part by a straight shoulder which is designed to rest against the scale of a bevel protractor. The aforesaid locking mechanism provides a movable shoulder which can be tightly clamped against one straight edge of the bevel protractor in order to locate the lay-out tool very securely in a particular position on the scale of the bevel protractor. The locking mechanism includes an actuator and a slide which are held within the body member, but which can move in directions perpendicular to each other. An external pin is provided whereby the actuator may be slid in a direction either against the force of an actuator spring or in the direction of extension of said spring, depending upon the particular position of the pin. When the actuator is moved in a given direction, the inclined bearing surface thereof urges the slide in a direction perpendicular to the movement of the actuator. When the slide moves, it too will move either against the force of a slide spring or in the direction of extension of the slide spring. However, it is to be understood that when the actuator spring is extended, the slide spring will be compressed and vice versa in order to give rise to a dead center action so that the lay-out tool of the present invention will always assume one of two positions.

The movement of the actuator in a particular direction will produce a movement of the slide in a direction perpendicular thereto. The slide includes a slide cam whereby when the slide is moved in a particular direction the cam initiates movement of a locking plate which has the movable shoulder thereon. Thus, movement of the actuator causes the movable shoulder either to approach the fixed shoulder or to move away from the fixed shoulder.

When the movable shoulder approaches the fixed shoulder, a clamping action is achieved in order to lock the lay-out tool of the present invention upon the straight edges of the bevel protractor. Movement of the actuator in the opposite sense will enable the lay-out tool to be released from the bevel protractor.

Other objects and many of the attendant advantages of this invention will be readily appreciated as the same becomes better understood by reference to the following detailed description when considered in connection with the accompanying drawings wherein:

FIG. 4 is an enlarged exploded perspective view of the lay-out tool of FIG. 1;

FIG. 5 is an enlarged fragmentary perspective view illustrating in further detail the relationship between the actuator and a portion of the slide of the present invention;

FIG. 6 is a fragmentary plan view showing the lay-out tool of the present invention secured upon the scale of a bevel protractor;

FIG. 7 is a side elevational view with a portion in section taken along the lines 7—7 of FIG. 6;

FIG. 8 is a fragmentary bottom plan view taken along the lines 8—8 of FIG. 7;

FIG. 9 is an end elevational view taken along the lines 9—9 of FIG. 8;

FIG. 10 is an enlarged sectional view taken along the lines 10—10 of FIG. 7 illustrating the lay-out tool of the present invention secured to the scale of a bevel protractor wherein the movable shoulder is in an extended position so that the lay-out tool is clamped in a particular position on the scale;

FIG. 11 is a view similar to FIG. 10 but wherein the movable shoulder has been brought to the retracted position by movement of a pin so that the lay-out tool may be slid to any desired position upon the scale; and FIG. 12 is a sectional view taken along the lines 12—12 of FIG. 10.

Figure 1:
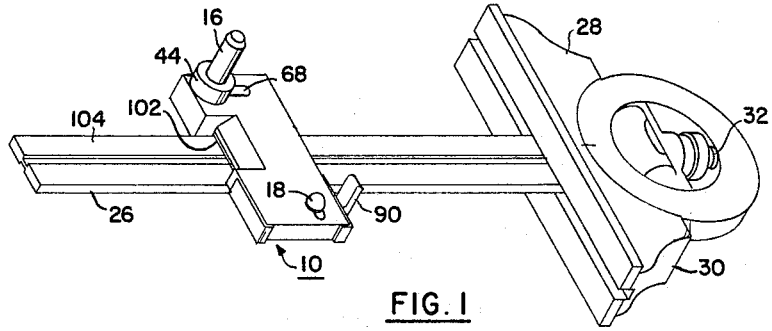
FIG. 1 is a perspective view of a bevel protractor having the lay-out tool of the present invention secured thereon.

Referring now in greater detail to the various figures of the drawing wherein like reference characters refer to like parts there is shown in FIG. 1 a lay-out tool 10 embodying the present invention. The lay-out tool 10 comprises as shown in FIG. 4 a body member 12 including a locating window 14, center punch 16 and a locking mechanism including pin 18 which urges actuator 20 in a particular direction. Slide 22 is urged in a direction perpendicular to the movement of actuator 20 whereby a movable plate 24 will assume either an inward extended locking position (FIG. 11) or an outward detracted position (FIG. 10) so that the lay-out tool 10 will either be clamped upon the scale 26 of bevel protractor 28 as illustrated in FIGS. 1, 2, 3, and 11 or slidable on the scale 26 in order to be adjusted to a new position.

Figure 2:
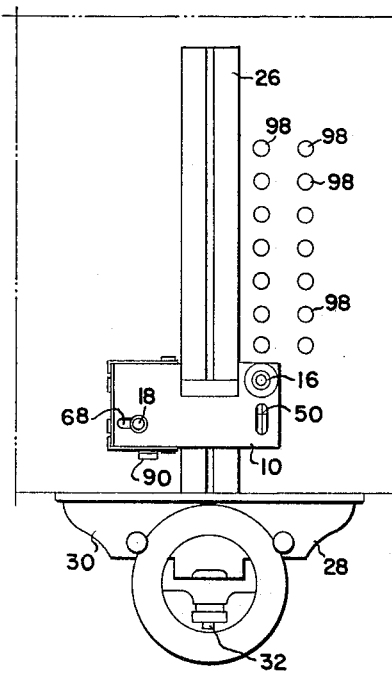
FIG. 2 is a plan view of the bevel protractor-lay-out tool combination of the present invention wherein a plurality of holes have been laid out on axes perpendicular to a given line.

The lay-out tool 10 may be used with a variety of bevel protractors, and it is only necessary to make appropriate adjustments in certain dimensions of the lay-out tool 10 during the design thereof as will become readily apparent. Thus, the lay-out tool 10 may be utilized with a conventional bevel protractor such as the one shown in FIGS. 1, 2, and 3 which includes a head 30 and scale 26 which may assume many angular relationships with respect to the head 30 as illustrated in FIGS. 1 and 2. The scale 26 extends perpendicularly from the head 30 in FIG. 2 whereas in FIG. 3 the scale 26 is adjusted to lie at an acute angle with respect to the head 30. This is accomplished by adjustment of the locking screw 32 in a well known manner. The other details of the bevel protractor 28 are well known to those skilled in the art, and no claim is made herein to the construction of the bevel protractor by itself, but only as to the lay-out tool either alone or in combination with the bevel protractor.

The details of lay-out tool 10 are shown in FIG. 4 wherein the body member 12 is revealed to be comprised basically of three sections, namely, punch section 34, gliding section 36, and locking section 38.

The punch section 34 has a round opening 40 which accommodates the extreme tip of the center punch 16 which is so dimensioned that only the extreme tip 42 thereof can project through the opening 40. This may be accomplished by providing the center punch 16 with an internal shoulder (not shown) which abuts against or is received in a special recess that is a sideward extension of the opening 40. This can also be provided in the collar 44 which extends upwardly from the punch section 34 and which receives the upper stem of the punch 16. The punch section 34 also possesses the locating window 14 which is generally elliptical in shape. A recessed area 46 is provided in the lower surface of the punch section 34 and receives translucent piece 48 which is so dimensioned to fit within the recessed area 46. The translucent piece 48 has cross lines 50 scribed in its lower surface so as substantially to eliminate parallax. Bolt 52 secures the translucent piece 48 in place. The punch section 34 is also fitted with a wear plate 54 that defines a fixed shoulder 56 which always contacts one of the straight edges of the scale of the bevel protractor. The wear plate 54 is designed to slide upon the scale and against the straight edge and thus should be of a material which is substantially resistant to wear.

The gliding section 36 is spaced a bit inwardly from both the punch section 34 and the locking section 38 in order that the gliding section 36 may be nested upon the scale of a bevel protractor. The gliding section 36 is preferably fitted with a substantially square wear plate 58 since there will be considerable sliding contact between the wear plate 58 and the top surface of the scale 26 of a bevel protractor as illustrated in FIG. 1.

The details of the locking section 38 are shown in FIG. 4, and when the components thereof are assembled, the lower surface of the locking section 38 will be substantially flush with the lower surface of punch section 34 with the gliding section 36 being somewhat set inwardly for nesting as previously discussed. The locking section 38 generally includes the actuator 20, actuator spring 60, slide 22, movable plate 24, and housing 62. The operative components of the locking section 38 are received in appropriately shaped chambers in the body member 12, namely, the actuator chamber 64 and the slide chamber 66. As will be discussed, both the actuator 20 and the slide 22 are designed for sliding movement within their respective chambers.

In order to permit the sliding movement of the actuator 20, a body slot 68 is provided which receives the stem 70 of the pin 18 which is then threaded into the opening 72 of the actuator 20. The actuator 20 includes a lug 74 about which one end of the actuator spring 60 is set. The actuator 20 further includes an inclined guiding surface 76 (FIG. 5) for engagement with the slide 22. The details of the slide 22 are shown in FIGS. 4 and 5.

In particular the slide 22 is generally elongated but possesses a ledge 78 which is engaged by the inclined gliding surface 76 of the actuator 20 so that when the actuator 20 is moved in the direction of the arrow 80 (FIG. 5), the surface 76 engages the ledge 78 so that the slide 22 is moved thereby in the direction of the arrow 82. The slide 22 also includes a notch 84 which is of a depth substantially the same as the thickness of the actuator 20 so that when the inclined gliding surface 76 of the actuator 20 engages the ledge 78 of the slide 22, the actuator 20 and the slide 22 will be substantially nested together. Hence, when the actuator 20 and the slide 22 are positioned within the respective chambers 64 and 66 in the body member 12, the lower surfaces of the actuator 20 and the slide 22 will lie substantially flush with the lower surface of the body member 12.

As further shown in FIG. 4 the slide 22 has a forked tip 86 which is designed to receive the slide spring 88 as shown in FIGS. 10 and 11. The slide 22 also possesses a handle 90, and a cam 92 projecting from one of its surfaces. The cam 92 is designed to be received within an inclined slot of the movable plate 24. In this manner the movement of the slide 22 is conveyed to the movable plate 24 since the cam 92 will bear against an edge of the inclined slot 94. One side of the movable plate 24 terminates in a thickened wear edge that is actually a movable shoulder 96 which lies generally parallel to but spaced from the fixed shoulder 56. When the movable shoulder 96 is moved toward the fixed shoulder 56, a clamping action will be exerted upon the scale of a bevel protractor, whereas when the movable shoulder 96 is moved away from the fixed shoulder 56, the user will be able to slide the lay-out tool 10 on the scale to a new position. Finally, a housing 62 is provided to cover the operative elements of the locking section 38 to enhance the appearance of the lay-out tool 10.

The interaction of the various components of the locking section 38 is particularly shown in FIGS. 10 and 11. In FIG. 10 the pin 18 has been so slid to the left as to permit the actuator spring 60 to be in its most expanded or relaxed position. In doing this, slide 22 was necessarily forced upwardly as viewed in FIG. 10 to cam movable shoulder 96 so that the slide spring 88 is under its maximum compression. In this condition, the movable plate 24 is in the locked position to eliminate clearance between the fixed shoulder 56 and the movable shoulder 96. Hence, the lay-out tool 10 is locked tightly upon the straight edges of scale 26. When it is desired to move the lay-out tool to a new position, it is a simple matter to unlock the lay-out tool 10 on the cross bar 26 by releasing pin 18 which causes handle 90 to move outwardly to the position of FIG. 11 to relax slide spring 88. As this occurs actuator 18 is cammed against spring 60 through the action of cam 92. In so doing the shoulder 96 moves inwardly, away from the scale to the position of FIG. 11.

Figure 3:
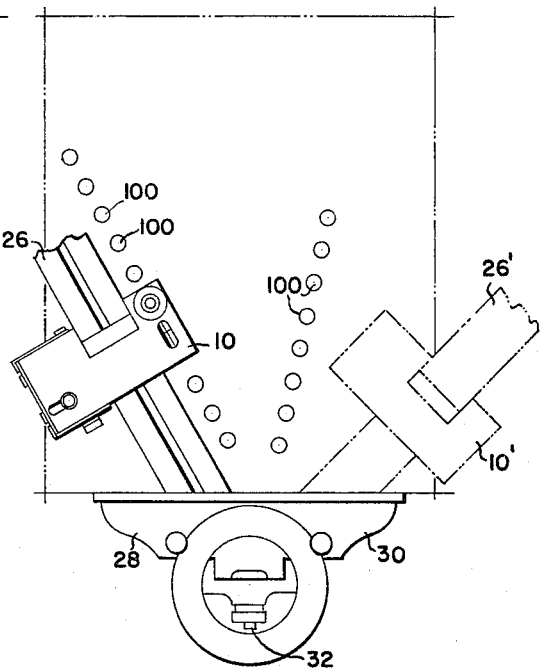
FIG. 3 is a view similar to FIG. 2 but wherein the holes have been laid out on axes situated at acute angles with respect to the reference line.

It is to be noted that the tip 42 of the center punch 16 is spaced exactly ½ inch from the cross lines 50 of the translucent pieces 48. This distance may be varied in accordance with the desires of the designer. However, when it is desired to form hole centers exactly ½ inch apart on sheet metal, it is a simple matter to do this merely by aligning the center of a given hole in the cross lines 50 and then tapping the center punch 16. As shown in FIGS. 2 and 3, this can be accomplished when the cross bar 26 lies perpendicularly with respect to the head 30 or at an acute angle as shown in FIG. 3. The holes 98 will be found to be in substantially perfect alignment with respect to each other.

Where the holes are to be spaced a distance other than the built-in spacing of ½ inch, it is a simple matter to locate the hole merely by aligning edge 102 (FIG. 1) at a particular point along the scale 26. If desired, vernier means may be associated with edge 102. Then the center punch 16 may be tapped to center punch a particular hole in sheet metal. The distance between the tip 42 and the edge 102 is of course determined by the geometry of the lay-out tool 10, and with this in mind, it will be a simple matter for a mechanic having ordinary skill accurately to lay out a series of holes of desired spacing on sheet metal.

Obviously many modifications and variations of the present invention are possible in the light of the above teachings. It is, therefore, to be understood that within the scope of the appended claims, the invention may be practiced otherwise than as specifically described.

What is claimed as the invention is:

1. A lay-out tool adapted to be locked upon the straight edges of a measuring instrument in a clamping action, comprising a body member including a central area defined by a fixed shoulder, and a movable shoulder formed on a movable plate, said clamping action being exerted upon said straight edges when said movable shoulder is moved toward said fixed shoulder, said movable shoulder being actuated by a locking mechanism including a slide for urging said movable plate towards and away from said fixed shoulder, said slide being biased by a slide spring, said slide also acting upon an actuator having an actuator spring, said slide spring being compressed when said actuator spring is extended and said slide spring being extended when said actuator spring is compressed to give positive clamping and unclamping actions, whereby when said locking mechanism is actuated to advance said movable shoulder away from said fixed shoulder, the lay-out tool may be slid to a new location and then reclamped by reversed movement of said slide.

2. The invention of claim 1 wherein said body member also includes a locating window and a center punch, said locking window being utilized to ascertain said new location, said center punch being utilized to center punch a hole center at a desired punch.

3. The invention of claim 1 including a wear plate on said body member.

4. The invention of claim 1 wherein said slide includes a handle.

5. The invention of claim 1 wherein said movable plate includes an inclined slot, and said slot includes a cam that is operative in said slot to cause movement of said plate.

6. The invention of claim 1 wherein said slide moves perpendicular to the direction of movement and the movable plate.

7. The invention of claim 1 wherein said locking mechanism includes a pin adapted to urge said actuator in a given direction to advance said slide in a direction perpendicular thereto, whereby said movable plate moves with said slide.

8. The invention of claim 7 wherein said actuator includes a guiding surface engaging a notch in said slide.

References Cited by the Examiner
UNITED STATES PATENTS

| | | | |
|---|---|---|---|
| 720,005 | 2/1903 | Deshler | 188—43 |
| 722,066 | 3/1903 | Wellman et al. | 188—43 |
| 817,991 | 4/1906 | Ross | 33—43 |
| 964,785 | 7/1910 | Johnson | 33—99 X |
| 2,197,505 | 4/1940 | Mosher | 33—189 |
| 2,583,578 | 1/1952 | Lowndes | 33—189 X |

LEONARD FORMAN, *Primary Examiner.*

W. D. MARTIN, JR., *Examiner.*